US 9,207,651 B2

(12) United States Patent
Jackson et al.

(10) Patent No.: US 9,207,651 B2
(45) Date of Patent: Dec. 8, 2015

(54) CONNECTION AWARE POWER CONTROL OF NETWORK DISPLAYS

(71) Applicant: Crestron Electronics, Inc., Rockleigh, NJ (US)

(72) Inventors: Daniel Jackson, Valhalla, NJ (US); Justin Kennington, New York, NY (US); John Spiro-Colwell, Westwood, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 109 days.

(21) Appl. No.: 14/246,856

(22) Filed: Apr. 7, 2014

(65) Prior Publication Data

US 2015/0002498 A1 Jan. 1, 2015

Related U.S. Application Data

(60) Provisional application No. 61/840,228, filed on Jun. 27, 2013.

(51) Int. Cl.
| | |
|---|---|
| G05B 11/01 | (2006.01) |
| G09G 5/00 | (2006.01) |
| G05B 13/02 | (2006.01) |
| G05B 9/00 | (2006.01) |
| G06F 15/16 | (2006.01) |
| G06F 17/00 | (2006.01) |

(52) U.S. Cl.
CPC .............. G05B 11/01 (2013.01); G05B 9/00 (2013.01); G05B 13/02 (2013.01); G09G 5/00 (2013.01); G06F 15/16 (2013.01); G06F 17/00 (2013.01)

(58) Field of Classification Search
CPC .......... G05B 11/01; G05B 13/02; G05B 9/00; G06F 15/173; G06F 15/16; G06F 17/00; G06F 9/00; G06F 3/038; H04L 29/06; G09G 5/00
See application file for complete search history.

(56) References Cited

U.S. PATENT DOCUMENTS

| | | | | |
|---|---|---|---|---|
| 5,732,212 | A * | 3/1998 | Perholtz | G06F 1/26 709/217 |
| 7,551,612 | B2 * | 6/2009 | Kobayashi | H04L 5/16 370/368 |
| 7,995,314 | B2 * | 8/2011 | Titus | H02H 3/04 361/42 |
| 8,195,844 | B2 * | 6/2012 | Fulton | G05B 19/05 710/15 |
| 8,378,608 | B2 * | 2/2013 | Robertson | H02M 5/4505 318/438 |
| 8,588,991 | B1 * | 11/2013 | Forbes, Jr. | G05B 19/02 700/286 |
| 8,984,617 | B1 * | 3/2015 | Fausak | H04L 67/42 709/217 |
| 2002/0068558 | A1 * | 6/2002 | Janik | H04L 12/2898 455/426.1 |
| 2008/0139222 | A1 * | 6/2008 | Falvo | H04M 3/42374 455/456.3 |
| 2010/0146038 | A1 * | 6/2010 | Hajiaghayi | H04L 67/2842 709/203 |
| 2010/0146148 | A1 * | 6/2010 | Schwimer | H04L 67/1002 709/238 |
| 2010/0238003 | A1 * | 9/2010 | Chan | G01D 4/004 340/538 |
| 2013/0086245 | A1 * | 4/2013 | Lu | G06F 1/3212 709/223 |
| 2013/0212420 | A1 * | 8/2013 | Lawson | G05B 19/4185 713/400 |
| 2013/0245843 | A1 * | 9/2013 | Bhageria | G06Q 10/04 700/287 |

* cited by examiner

*Primary Examiner* — Fred Tzeng
(74) *Attorney, Agent, or Firm* — Crestron Electronics Inc

(57) ABSTRACT

Controlling the power state of an internet protocol (IP) network display device using the cumulative connection status of one or more client devices to presentation a gateway. The first client device to connect to the presentation gateway causes it to transmit an instruction over the IP Network to the display device to turn-on. When the last of the client connections to the presentation gateway has terminated, the presentation gateway transmits either a sleep or power-down instruction over the IP network to the display device, optionally, after a countdown timer expires.

11 Claims, 6 Drawing Sheets

CONNECTION AWARE POWER CONTROL OF NETWORK DISPLAYS

BACKGROUND OF THE INVENTION

1. Technical Field

The present invention relates to a system and method for controlling a video display device over network connection, and more particularly to controlling a video display device according to a connection state of one or more client devices to a presentation gateway over an Internet Protocol ("IP") network.

2. Background Art

An increasing global awareness of energy consumption continues to keep the electronics industry focused on improved ways to control and conserve power, particularly for networked electronic devices.

One prior solution has been to implement an automatic power management technique that transitions a device to low-power or power-off state. For example, the Advanced Configuration and Power Interface ("ACPI") enables a system to conserve power by automatically transitioning a device to a low power state (e.g., Standby, Suspend, Hibernate, sleep, and deep-sleep) when full power is not desired. In a typical arraignment, the transition back to a higher power state occurs subsequent to the physical pressing of a button, key, or by moving an attached input device (e.g., a mouse.)

Similarly, if any display devices are attached, they typically continue to waste energy when permitted to remain powered-on during long idle periods (e.g. when not displaying any content or being viewed.) Normally, mitigating this type of power consumption has included design compliance with the Video Electronics Standards Association ("VESA") Display Power Management System protocol ("DPMS.") This protocol may be selectively used to shut down parts of the monitor's circuitry after a period of inactivity. Typically, an electronic device monitors for (e.g. user) activity and after a determined amount time, sends the appropriate sleep signal to the monitor. The monitor is woken-up by the system when activity is detected.

Within a network context, one solution has been to have the waking event include a network message to a network adapter. For example, Wake on LAN ("WOL") is an Ethernet computer networking standard that allows a computer to be turned on or awakened by a network message. This technology involves the sending of a wake packet, over an Ethernet connection, to a selected sleeping node. the network interface of a sleeping device may scan all incoming transmissions from a network and wake up upon detection of a wake packet.

Similarly, audio and video interconnect systems for high-definition video, such as the High-Definition Multimedia Interface ("HDMI") includes an optional Consumer Electronics Control ("CEC") protocol that allows a connected device to issue control commands to another connected device. However, CEC implementations tend to be manufacturer-specific, which complicates the control of display devices from different manufacturers.

While the prior solutions may be suitable for the particular purpose to which they address, they are not suitable for mitigating power consumption of a display device within the context of a multi-user collaboration system according to the connection state of one or more client device connections to a presentation gateway on an IP network. Therefore, there is a need in the art for controlling a networked display device within the context of a multi-user collaboration system.

SUMMARY OF THE INVENTION

It is to be understood that both the general and detailed descriptions that follow are exemplary and explanatory only and are not restrictive.

DISCLOSURE OF INVENTION

According to one aspect of the invention, there is provided a method for controlling the power state of a display device according to one or more client device's IP network connection state through a presentation gateway. Preferably, networked devices use IP to relay datagrams to other devices using their IP addresses.

According to another aspect of the invention, the presentation gateway communicates video content to its display device over a video connection; but controls the power state of the display device over an IP network connection.

According to an aspect of the invention, there is provided a method for client devices to establish IP network connections to a presentation gateway upon executing a previously downloaded multi-client application. Preferably, the multi-client application is downloaded when a client device points a standard World Wide Web ("WWW") browser to the presentation gateway's IP address. Preferably, the multi-client application is further encoded with the IP address of the presentation gateway that it was downloaded from.

According to one aspect of the invention, the display automatically changes its power state by powering on, after receiving the power-on instruction over its IP network connection to the presentation gateway. Preferably, the display powers on or transitions from an intermediate standby mode to an awake mode.

More than one client device may connect to the presentation gateway. However, in those cases where more than one client device are to be concurrently and cumulatively connected, the presentation gateway preferably only transmits a power-on instruction to its display over the IP network connection in response to the first successfully connected client device. In an advantageous aspect, subsequent concurrent client connections do not cause the presentation gateway to attempt power-on its display device because, the first successful client connection already caused the presentation gateway to power on its display device. Therefore, the display device remains powered on for the duration of any remaining successful connections.

According to another aspect, as soon as the last client device disconnects or terminates its connection to the presentation gateway, the presentation gateway transmits a power-off instruction to its display over the IP network connection. The display, in response to receiving the power-off instruction over its IP network connection, responds by changing its power state by powering off. According to another aspect, the presentation gateway waits specified period of time (e.g. a timeout) after the last client device connection to it has terminated, before transmitting the power-off instruction over its IP network connection to its display.

According to another aspect, when the first client device connects to the presentation gateway, the presentation gateway may further require a validation code be entered into a confirmation screen presented by the multi-user collaboration application, before transmitting a power-on instruction to its display over the IP network connection.

The present invention seeks to overcome or at least ameliorate one or more of several problems, including but not limited to: automatically controlling a video display device according to the connection state of one or more client devices to a presentation gateway.

BRIEF DESCRIPTION OF THE DRAWINGS

The present invention will now be described, in a non-limiting manner, referring to illustrations, where like reference numerals designate corresponding parts throughout the several views. The drawings are not necessarily drawn to scale, emphasis instead being placed upon clearly illustrating the principles of the present invention.

Figure 1:
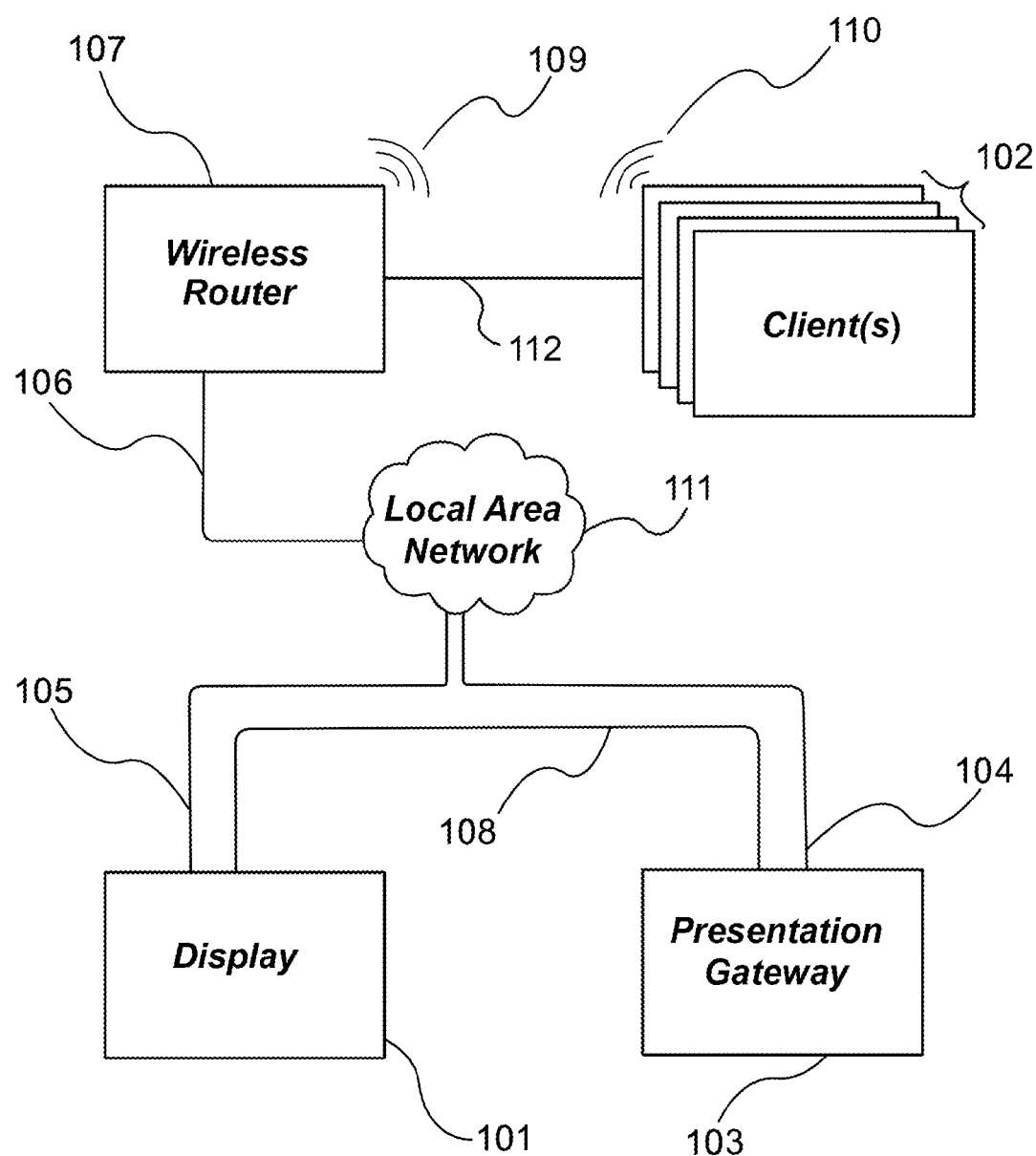

Brief Description of the Several Views of the Drawing

FIG. 1 is a schematic view of an illustrative multi-client media collaboration system according to one aspect of the invention.

Figure 2:
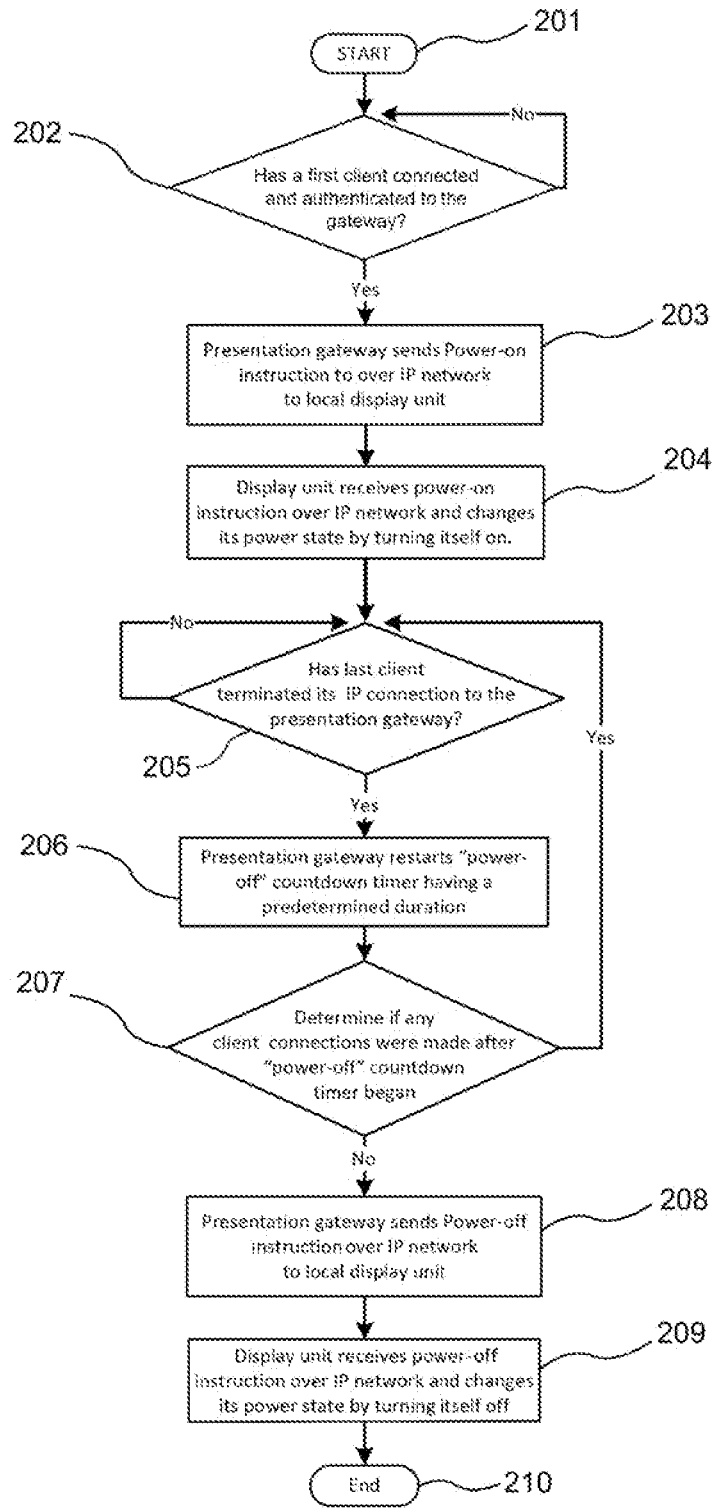

FIG. 2 is a flowchart illustrating a method for a presentation gateway controlling the power state of a display device, according to one aspect of the invention.

Figure 3:
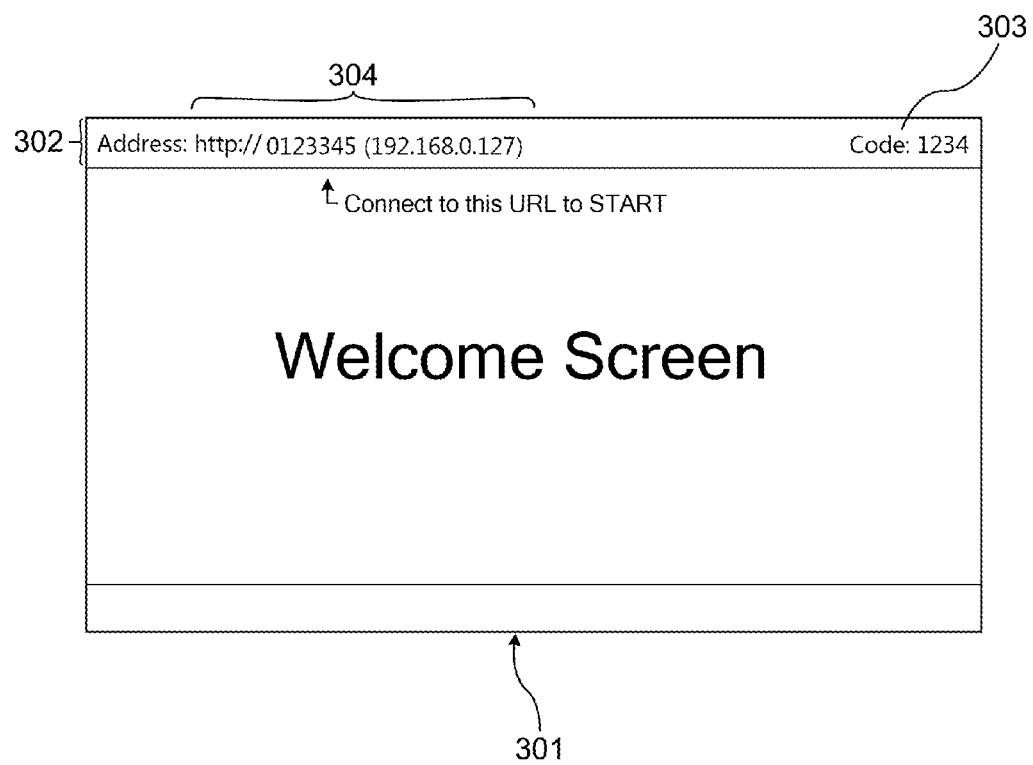

FIG. 3 illustrates a user interface showing a welcome screen with a hostname and/or IP address and a verification code displayed thereon according to another aspect of the invention.

Figure 4:
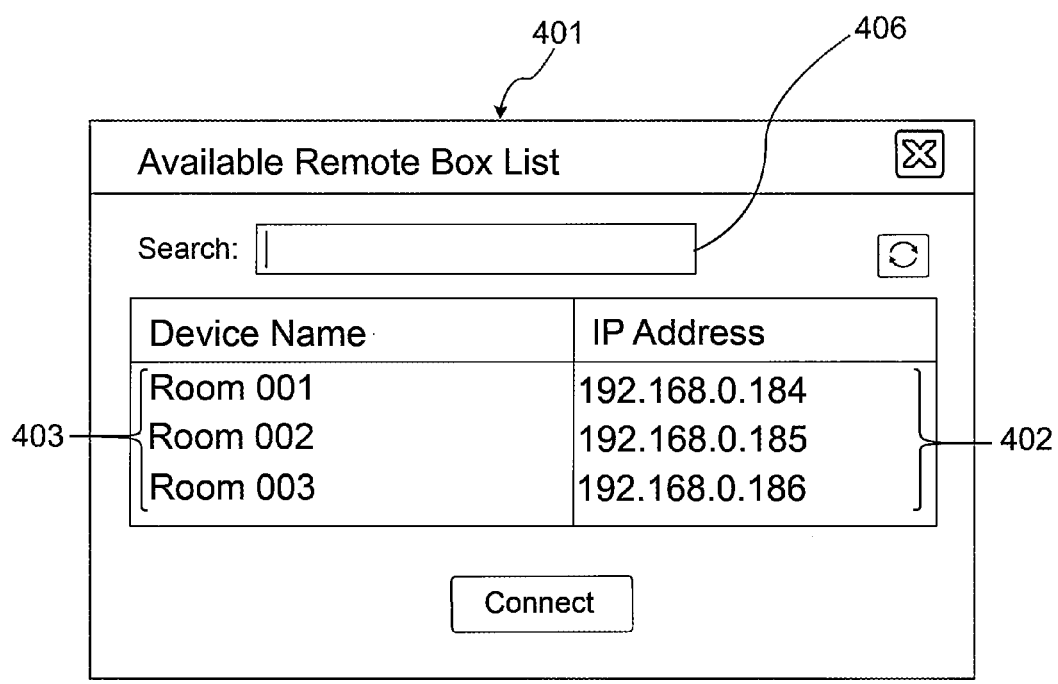

FIG. 4 illustrates an exemplary user interface showing a list of available presentation gateways, according to one aspect of the invention.

Figure 5:
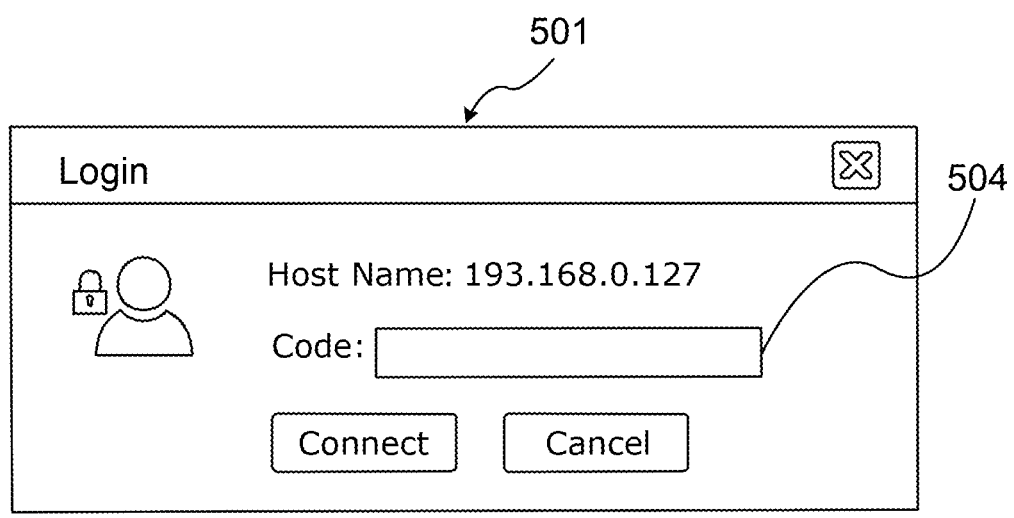

FIG. 5 illustrates an exemplary user interface showing a presentation gateway verification screen, according to another aspect of the invention.

Figure 6:
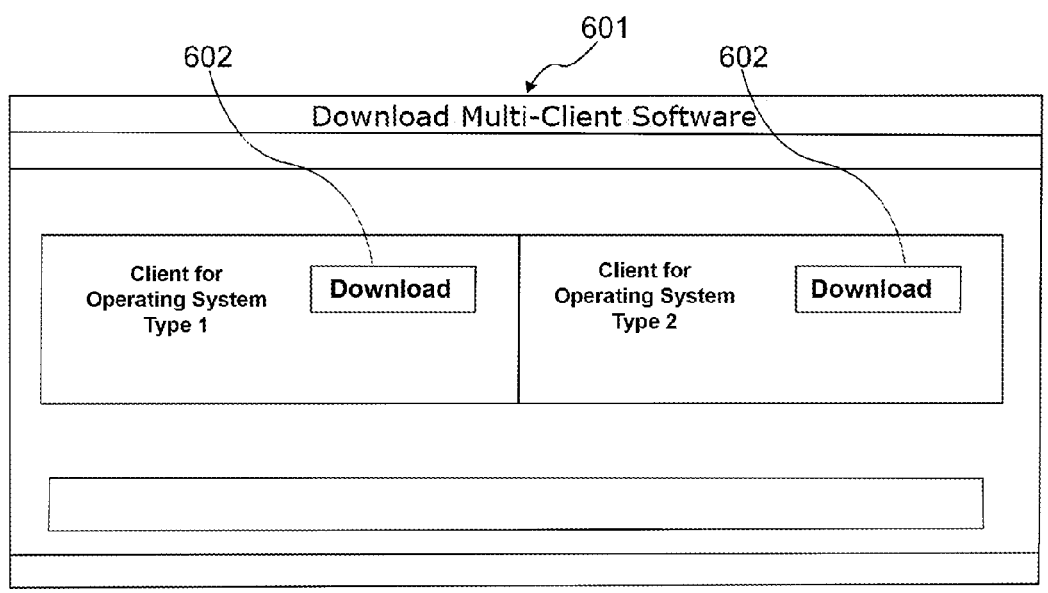

FIG. 6 illustrates an exemplary user interface for downloading the Multiuser client software, according to another aspect of the invention.

LIST OF REFERENCE NUMBERS FOR THE MAJOR ELEMENTS IN THE DRAWING

The following is a list of the major elements in the drawings in numerical order.
101 Display Device
102 Client Devices
103 Presentation Gateway
104 Presentation Gateway LAN Connection
105 Display LAN Connection
107 Router
108 Display Video Link
109 Wireless Router Radio Connection
110 Client Radio Connection
111 Local Area Network (LAN)
112 Wired Client Connection
301 Welcome Content Screen
303 Authentication Code
304 Session URL
401 Available Gateway List Dialog
402 IP Address Names
403 Locator Names
406 Search Field
501 Login Dialog
504 Login Response Field
601 Download Screen
602 Download Links

DETAILED DESCRIPTION OF THE INVENTION

The preferred embodiment of the present invention is described herein in the context of a multi-client media collaboration system, but is not limited thereto, except as may be set forth expressly in the appended claims.

Mode(s) for Carrying Out the Invention

Referring first to FIG. 1, shown is a schematic view of an illustrative multi-client media collaboration system in accordance with one embodiment of the invention. The multi-client media collaboration system may include a presentation gateway 103, display device 101, router 107, and one or more client devices 102. Client device 102 can be a laptop, desktop computer, server, network, and/or cloud computer system, a mobile computing device, smart phone, a mobile phone, a media console, or the like.

The presentation gateway 103 may be coupled to display device 101 by display video link 108. Video link may be any suitable wired link, wireless link, or any combination suitable for providing media and other content from presentation gateway 103 to display device 101 for displaying. For example, display video link 108 may include a coaxial cable, video and audio cable, S-video cable fiber optic, ribbon cable, multi cable, HDMI cable, Digital Visual Interface ("DVI") cable, component, DisplayPort cable, Visual Graphics Array ("VGA") cable, Apple Display Connector ("ADC") cable, Universal Serial Bus ("USB") cable, Firewire cable, or any other suitable cable or wire for coupling presentation gateway 103 with display device 101.

The presentation gateway 103 may include any suitable electronic device or components for providing display content to display device 101. For example, the presentation gateway 103 may be operative to provide one or more output signal(s) representing content, GUI's, interactive elements, or any other suitable object operative to be displayed on display device 101. Content represented by the output signal may include, for example, multimedia (e.g., documents, music, video, and images), interface screens, (e.g., application dialogs), remote content display (e.g., screen sharing, or digital whiteboard collaborations), user input prompts, or any other suitable content.

The display device 101 has a local IP network connection to a local area network 111 ("LAN") that includes a router 107. In one embodiment, Router 107 may be "wired." In another embodiment, Router 107 may additionally include wireless radio communication capabilities.

Still referring to FIG. 1, router 107 is shown having a wired client connection 112 options, and a wireless router radio 109 option. Therefore, some embodiments may wire connections, wireless connections, or any combination thereof. Moreover, router 107 can use the wireless router radio connection 109 in order communicate with a variety of other devices.

Similarly, in an alternative embodiment, client device 102 can be equipped with either a wired connection, wireless connection, or any combination of thereof. In another embodiment, display device 101 and presentation gateway 103, may have their wired connections (e.g. Presentation Gateway LAN connection 104, Display LAN connection 105, and Display Video Link 108) substituted with wireless connections.

Networks may include any of the following types: Local Area Networks ("LAN"), ("PAN), Metropolitan Area Networks ("MAN"), Wide Area Networks ("WAN"), Cellular, and/or Telephone networks, or any combination of thereof.

Additionally, any or all of the wired connections 104, 105, 106, 112 between devices may be substituted, instead with, wireless connections. Wireless connections between devices (some not shown) may include, for example, any of the following types: Institute of Electrical and Electronics Engineers, Inc. ("IEEE") 802.3 ("Ethernet"), IEEE 802.11 ("WiFi®"), IEEE 802.15 ("Zigbee®"), IEEE 802.16 ("WiMax™"), Ultra-Wide Band ("UWB"), cellular systems (e.g., 0G, 1G, 2G, 3G, or 4G technologies), short-range radio circuitry (e.g., walkie-talkie type circuitry), infrared (e.g., IrDA), radio frequency (e.g., Dedicated Short Range Communications ("DSRC" and "RFID"), wireless USB, and the like.

Any number of communication paths can be used. Paths can be separate paths or include various subsets, which can be multiplexed onto a common path. Alternative embodiments can have fewer or more signal paths. Additionally, the set of communication paths can be provided by various connectors. In some embodiments, some signals can have dedicated paths and in other embodiments signals can share one or more paths.

The display device 101 may be any suitable screen or monitor for displaying media or other visual content to a user. For example, display device 101 may be a projector, a monitor (e.g., a computer monitor), a flat-panel (e.g., LCD, LED, and Plasma, etc.), a television set (e.g. CRT), a HMD (Head mounted display), a Heads Up Display ("HUD"), an implantable or worn display (e.g., wearable contact-lens displays), a media player, a video game console display, a cellular telephone display, a mobile tablet, a smart phone, a Personal Digital Assistant (PDA), any component coupled with a graphical output device, any combinations thereof, or any other suitable screen.

The multi-client media collaboration system may include a router 107 having a wireless router 107 connection to LAN. Router 107 may act as both a wireless or wired connection point for one or more clients. In a wireless configuration, router 107 communicates with clients using wireless router radio connection 109, in like manner, clients communicate with Router 107 using a wireless client radio connection 110. In a wired client configuration, Router 107 communicates back and forth with clients using a wired client connection 112.

The presentation gateway 103 has a Presentation Gateway LAN connection 104 to a Local Area Network 111. The presentation gateway 103 is able to directly control display device 101 over Local Area Network 111. For example, the presentation gateway 103 may transmit any "wake-up", sleep, "power-on", or power-off instructions over Local Area Network 111 to display device 101. Display content is provided by presentation gateway 103 over display video link 108 to display device 101.

All connected devices 101, 102, being connected on the same network, are addressable by an IP address. Therefore, a unique IP address is assigned to each one of the client devices 102, the router 107, the presentation gateway 103, and the display device 101. This includes any intermediate hardware (not shown) within LAN.

IP addresses can be static or dynamic. If a device is assigned a static IP address, that address does not change on the network. On the other hand, a dynamic IP address is dynamically assigned to a device, usually by a remote server which is acting as a Dynamic Host Configuration Protocol ("DHCP") server. In one embodiment router 107 may act as a DHCP server. In another may include a DHCP server. In yet another embodiment, LAN may include additional intermediate network connectivity/routing hardware which may include DHCP. The connection topology, including the number and arrangement of bridges, router, and the like, may be modified as desired.

Now referring to FIG. 2, shown is a simplified flowchart of controlling the display device 101, according to one embodiment of the present invention. The start of the control procedure may execute periodically or may be event driven (i.e., in response to connection activity to the presentation gateway 103). At step 202, the presentation gateway 103 determines if the first (of any) client devices 102 have made a connection to it. If the first connection is not detected, the control procedure continues client detection by looping. If a first connection is authenticated the procedure at step 203 sends a power-on instruction to its display over LAN. A wakeup instruction may be transmitted instead (if the display is a sleep mode). At step 204, the display receives the power-on instruction via its display LAN connection 105 and powers on (or wakes-up from a power saving mode).

While at least one client remains connected to the presentation gateway 103, the process indefinitely loops at step 205. When the last client terminates its connection, a countdown timer is initiated at step 206. Among other things, the countdown timer provides a time window in which a reconnection will prevent unnecessary or rapid power state transitions for the display device 101. If a client reconnects during the window the process jumps to step 205. Otherwise, the instruction to power-off the display is sent out over the IP network at step 208. The display device 101, at step 209, receives the instruction and reacts accordingly by powering off, thereby ending the procedure at step 201. In an alternative embodiment, the process may loop back to step 201, effectively creating a loop.

FIG. 3 shows an example of a welcome content screen 301 that presentation gateway 103 is providing display device 101 over display video link 108. In one embodiment, presentation gateway 103 displays the welcome content screen 301 notwithstanding the power state of the display device 101. This is because the power state of display device 101 may be controlled over IP via the display LAN connection 105.

Welcome content screen 301 has a quick start bar showing the specific presentation gateway 103 session URL 304 and an authentication code 303. When a client device 102 web browser navigates to the session URL 304 (or its IP address) displayed on welcome content screen 301 the download screen 601 shown in FIG. 6 is displayed. In one embodiment, the authentication code 303 may be used at step to authenticate a client using the login screen, shown in FIG. 5.

With reference now to FIG. 4, an available presentation gateway 103 list dialog may show a list of available presentation gateways 103, according to locator names 403 or IP address names 402. A search field 406 may be used to assist if desired.

With reference now to FIG. 5, client devices 102 validation, verification, or authentication may be accomplished, for example, at a login dialog 501 presented by the multiuser client software. Successful verification or authentication comprises entering the same authentication code 303 as presented on the welcome content screen 301 into the login response field 504.

With reference now to FIG. 6, download screen 601 appears when a client device 102 using a web browser, navigates to the session URL 304 (or its IP address) displayed on welcome content screen 301. According to an embodiment, download links 602 are provided for various device platforms. Selecting one of the download links 602 starts a download of the multiuser client software.

As used herein, the terms "link" and "hyperlink" refer to a selectable connection from one or more words, pictures or other information objects to others in which the selectable connection is presented within the web browser. The information object can include image, sound, video, or executable programs. Selection is typically made by "clicking" on the link using an input device such as a mouse, track ball, touch screen and the like. Of course, one of ordinary skill in the art will appreciate that any method by which an object presented on the screen can be selected is sufficient.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded as illustrative rather than restrictive. Therefore, the scope of the claimed invention should be limited only by the appended claims.

List of Acronyms Used in the Detailed Description of the Invention

The following is a list of the acronyms used in the specification.
DHCP Dynamic Host Configuration Protocol
DSRC Dedicated Short Range Communications
GUI Graphical User Interface
HMD Head mounted display
HTTP Hyper-Text Transfer Protocol
HUD Heads up display
IEEE Institute of Electrical and Electronics Engineers
IP Internet Protocol
IrDA Infrared Data Association
LAN Local Area Network
LCD Liquid Crystal Display
LED Light Emitting Diode
MAN Metropolitan Area Networks
PAN Personal Area Networks
PDA Personal Digital Assistant
RFID Radio-frequency identification
URL Uniform Resource Locator
USB Universal Serial Bus
UWB Ultra-Wide Band
VESA Video Electronics Standards Association
WAN Wide Area Networks Alternate Embodiments Alternate embodiments may be devised without departing from the spirit or the scope of the invention.

What is claimed is:

1. A method for controlling a power state of a display device, the display device having a IP network connection to one or more client devices networked through a presentation gateway, the method comprising the steps of:
    (a) connecting a first client device over an IP network to said presentation gateway;
    (b) powering on said display device by having said presentation gateway transmit an instruction over said IP network to said display device; and
    (c) powering off said display device by having said presentation gateway transmit an instruction over said IP network to said display device after when all client device connections to said presentation gateway have terminated.

2. The method of claim 1, wherein connecting said first client device over an IP network to said presentation gateway further comprises: executing a multi-user collaboration application on said client device.

3. The method of claim 2, wherein said multi-user collaboration application for establishing an IP network connection to said presentation gateway is downloaded with a web browser over a HTTP connection to said presentation gateway.

4. The method of claim 2, wherein in response to said network connection from said first client device, said presentation gateway waits for a user to enter a valid authentication code into a confirmation screen generated by said multi-user collaboration application before said presentation gateway transmits a power-on command to said display device over said IP network connection.

5. The method of claim 2, wherein said presentation gateway waits a specified period of time after the last client device connection has terminated before powering off said display device.

6. A multi-client media collaboration system for controlling a power state of a remote network display device comprising:
    (a) a remote network display device having a IP network connection to one or more client devices;
    (b) one or more networked client devices; and
    (c) a presentation gateway for remotely controlling the power state of said display device, wherein said presentation gateway transmits a command over its IP network connection to said remote display device thereby powering it on when a first client device connects thereto, and said presentation gateway transmits a command over its IP network connection to said remote display device thereby powering it off when the last client device disconnects.

7. The system of claim 6, wherein said one or more client devices establish an IP network connection to said presentation gateway by executing a multi-user collaboration application installed on said client computer.

8. The system of claim 7, wherein said multi-user collaboration application for establishing an IP network connection to said presentation gateway is downloaded with a web browser over a HTTP connection to said presentation gateway.

9. The system of claim 7, wherein said presentation gateway waits until a user successfully enters a valid authentication code into a confirmation screen being presented by said multi-user collaboration application before said presentation gateway remotely controls the power state of said display device.

10. The system of claim 7, wherein said presentation gateway waits a specified period of time after the last client device connection has terminated before powering off said display device.

11. The system of claim 7, wherein said presentation gateway waits a specified period of time after the last client device connection has terminated before powering off said display device.

* * * * *